(12) United States Patent  (10) Patent No.: US 6,681,793 B2
Mike  (45) Date of Patent: Jan. 27, 2004

(54) TOP-ENTRY BALL VALVE ASSEMBLY HAVING CAMMING SURFACES

(76) Inventor: Jeff Mike, P.O. Box 428, Schriever, LA (US) 70395-0428

( * ) Notice: Subject to any disclaimer, the term of this patent is extended or adjusted under 35 U.S.C. 154(b) by 62 days.

(21) Appl. No.: 10/122,939

(22) Filed: Apr. 12, 2002

(65) Prior Publication Data

US 2003/0193036 A1 Oct. 16, 2003

(51) Int. Cl.[7] .................................................. F16K 5/06
(52) U.S. Cl. ............... 137/15.22; 251/288; 251/315.12; 251/174; 251/163
(58) Field of Search .................................. 257/159, 163, 257/174, 192, 288, 315.12, 315.08, 315.09, 315.11, 315.1; 137/15.22

(56) References Cited

U.S. PATENT DOCUMENTS

| 3,037,738 | A | * | 6/1962 | Jackson et al. | 251/174 |
| 3,245,653 | A | * | 4/1966 | Lavigueur | 251/159 |
| 3,771,545 | A | * | 11/1973 | Allen | 251/315.08 |
| 3,934,606 | A | * | 1/1976 | Matthews | 251/159 |
| 4,175,577 | A | * | 11/1979 | Kacal et al. | 251/315.08 |
| 4,262,691 | A | * | 4/1981 | Kacal | 251/315.08 |
| 4,390,039 | A | * | 6/1983 | Johnson et al. | 251/315.08 |
| 4,566,482 | A | * | 1/1986 | Stunkard | 251/315.08 |
| 4,641,682 | A | * | 2/1987 | Harris | 251/174 |
| 4,676,480 | A | * | 6/1987 | Garceau et al. | 251/163 |
| 4,718,444 | A | * | 1/1988 | Boelte | 251/174 |
| 5,313,976 | A | * | 5/1994 | Beasley | 251/174 |
| 5,611,516 | A | * | 3/1997 | Reinicke et al. | 251/163 |

* cited by examiner

Primary Examiner—John Bastianelli
(74) Attorney, Agent, or Firm—George A. Bode; Lisa D. Velez; Bode & Associates

(57) ABSTRACT

A top-entry ball valve assembly that includes top and bottom camming plates which are coupled to top and bottom shoulders of the ball valve member. The camming plates include a first pair of opposing camming corner-surfaces to displace the spring-biased valve seat from the perimeter of the ball valve member when it is rotated between open and closed positions. The plates further include a second pair of opposing camming corner-surfaces to fully retract the spring-biased valve seat when being serviced so that the retraction tool can be inserted to hold the seats in place with little or no damage to the forward end of the seats.

15 Claims, 5 Drawing Sheets

TOP-ENTRY BALL VALVE ASSEMBLY HAVING CAMMING SURFACES

BACKGROUND OF THE INVENTION

1. Field of the Invention

The present invention relates to ball valves and, more particularly, to a wearless top-entry ball valve assembly with a pair of camming plates coupled to the top and bottom of the ball valve member to retract the valve seats as the ball valve is rotated between open and closed positions; and, the assembly also allows for automatic flushing, i.e., flushing without removing the bonnet.

2. General Background

Current ball valves, such as disclosed in U.S. Pat. No. 4,718,444, issued to KF Industries, Inc., on application to Boelte, entitled "VALVE SEAT RETRACTION METHOD AND APPARATUS" do not properly seal after wear on the ball valve member and seat. The wear or damage to the seats can be in part attributed to the friction from the retraction tool as the retraction tool screws into the valve housing and retracts the seat. Repeated use of the retraction tool creates grooves and nicks in the forward end of the seat which compromises the sealing capabilities of the seat.

Additionally, I have determined that there is wear on the ball and nylon seat rings from repeated turning of the ball valve member from its open and closed position. Such wear also compromises the sealing engagement between the ball valve member and the seats.

Several other inventions related to ball valves have been patented.

For example, U.S. Pat. No. 4,262,691 issued to ACF Industries, Incorporated, of New York, N.Y., on the application of G. W. Kacal, entitled "CAM MEANS FOR BALL VALVE SEAT RINGS," discloses a ball valve in which cams are mounted on the ball member to engage spring-biased seat rings and cam the seat rings to the fully retracted position at which the seat rings are retained. The seat rings are held in place while the ball member is removed for repair.

U.S. Pat. No. 3,771,545 issued to Cameron Iron Works, Inc., on the application of H. Allen, entitled "BALL VALVE," discloses a ball valve including a ball closure having truncated camming surfaces and the bonnet must be removed for retraction.

U.S. Pat. No. 4,390,039 issued to Jamesbury Corporation, of Worcester, Mass., on the application of D.A. Johnson, et al., entitled "VALVE ASSEMBLY AND DISASSEMBLY DEVICE," discloses a ball valve having pins to restrain the seats while the ball member is removed for repair.

Other top entry ball valves include U.S. Pat. No. 5,313,976, issued to Keystone International Holdings Corp., on application to Beasley, entitled "TOP ENTRY BALL VALVE AND METHOD OF ASSEMBLY"; U.S. Pat. No. 4,566,482, issued to Stunkard, entitled "TOP ENTRY TRUNNION BALL VALVE"; U.S. Pat. No. 4,175,577, issued to ACF Industries, Inc., on application to Kacal et al., entitled "MEANS AND METHOD FOR IN-LINE REMOVAL OF SEAT RINGS IN BALL VALVES"; and, U.S. Pat. No. 3,037,738, issued to Jackson et al., entitled "ROTOR VALVE" none of which meet the needs of the present invention.

As will be seen more fully below, the present invention is substantially different in structure, methodology and approach from that of the known top-entry ball valve assemblies.

SUMMARY OF THE PRESENT INVENTION

The preferred embodiment of top-entry ball valve assembly of the present invention solves the aforementioned problems in a straight forward and simple manner.

Broadly, the present invention contemplates a ball valve assembly comprising: a ball valve member having a stem; a pair of spring-biased valve seats adapted to be retracted; and, a pair of camming plates fixedly coupled to the top and bottom of the ball valve member about the stem and which rotate in unison with said stem, each camming plate includes a first pair of opposing camming corner-surfaces for retracting the spring-biased valve seats a first predetermined distance as the ball valve member is rotated between open and closed positions. Additionally, a second pair of opposing camming corner-surfaces are provided for full retraction of the spring-biased valve seats a second predetermined distance wherein the second predetermined distance is greater than the first predetermined distance.

The present invention contemplates a camming plate that is a quasi-rectangular or even quasi-square shaped plate with truncated corners wherein the first pair of opposing camming corner-surfaces has a first arc-length and a first radius measured from a longitudinal axis of said stem to a center of said first arc-length; and said second pair of opposing camming corner-surfaces has a second arc-length and second radius measured from said longitudinal axis of said stem to a center of said second arc-length.

In view of the above, a feature of the present invention is to provide a top-entry ball valve assembly which minimizes the wearing of the seat and ball so that the sealing engagement of the ball valve member with the seat is maintained after repeated use.

Another feature of the present invention is to provide a top-entry ball valve assembly that minimizes wearing of the seat or damage to the seat by a retraction maintaining or holding tool when the valve assembly is serviced or retraction maintaining tool used for flushing debris from between the ball and seats.

Another feature of the present invention is to provide a top-entry ball valve assembly that has seats that are not retracted from the ball under normal operating conditions.

Another feature of the present invention is to provide a top-entry ball valve assembly that allows for "automatic flushing," i.e., flushing debris from between the ball and seats without removing the bonnet and under normal operating conditions of the valve.

Another feature of the present invention is to provide a top-entry ball valve assembly that does not expose the interior of the valve during flushing of debris from between the ball and seats, unlike the devices of Boelte U.S. Pat. No. 4,718,444 and Johnson, et al., U.S. Pat. No. 4,390,039.

Another feature of the present invention is to provide a top-entry ball valve assembly in which both seats simultaneously retract under equal force (for example Johnson, et al., U.S. Pat. No. 4,390,039 has four (4) different retractors).

The above and other objects and features of the present invention will become apparent from the drawings, the description given herein, and the appended claims.

BRIEF DESCRIPTION OF THE DRAWING

For a further understanding of the nature and objects of the present invention, reference should be had to the following description taken in conjunction with the accompanying drawings in which like parts are given like reference numerals and, wherein.

DETAILED DESCRIPTION OF THE PREFERRED EMBODIMENT

Figures 1A, 1B:
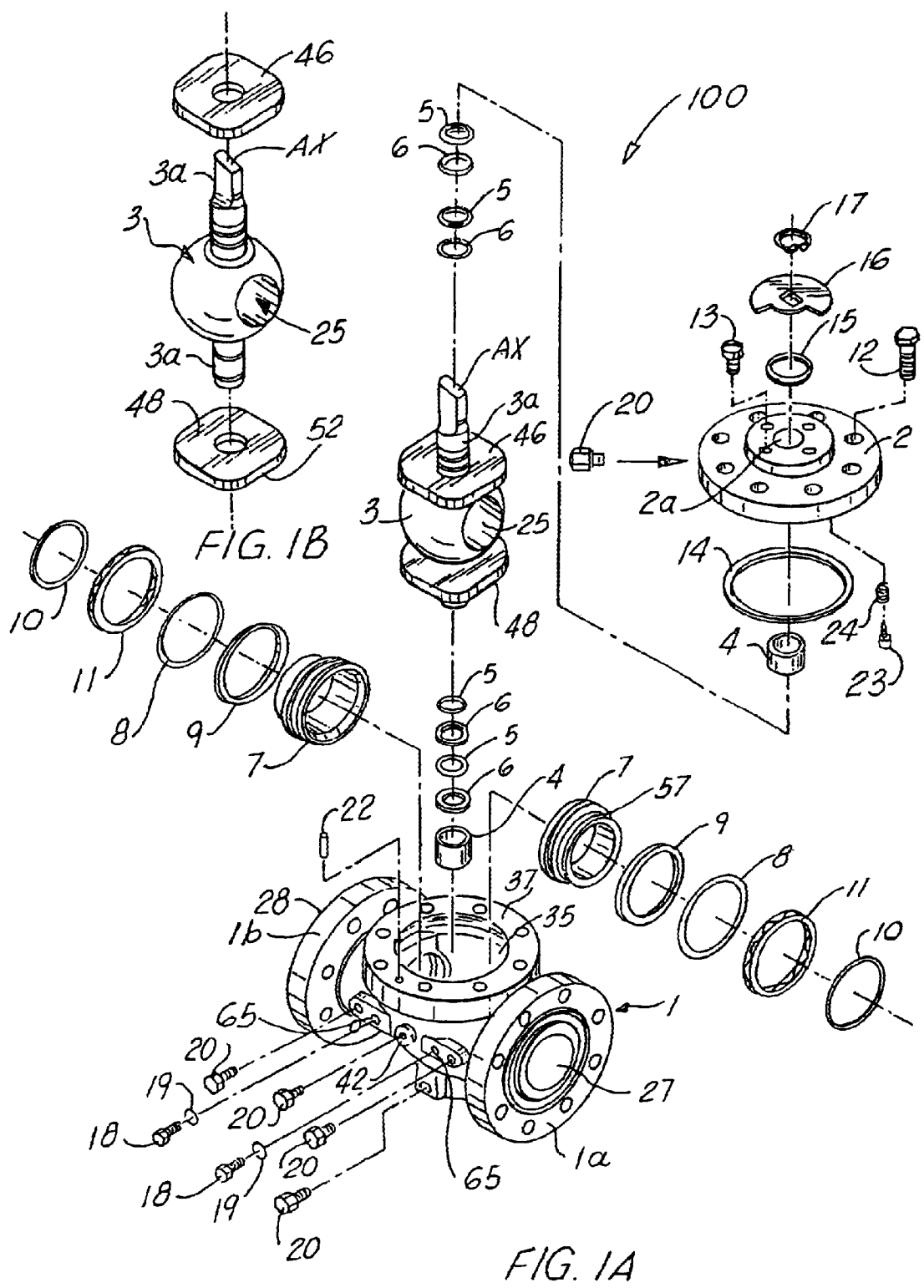
FIG. 1A illustrates an exploded view of the top-entry ball valve assembly of the present invention.
FIG. 1B illustrates an exploded view of the ball valve member with its stem and the camming plates.
Figure 2:
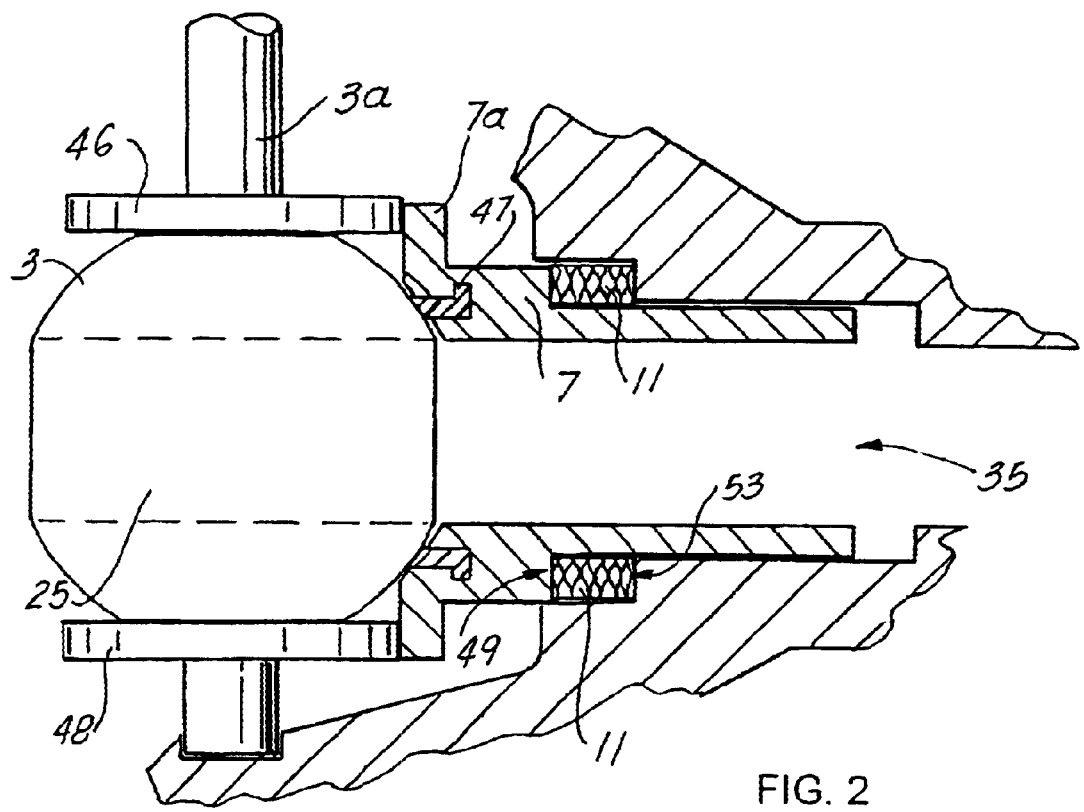
FIG. 2 illustrates a side cross-sectional view of the top-entry ball valve assembly in the open position.
Figure 3:
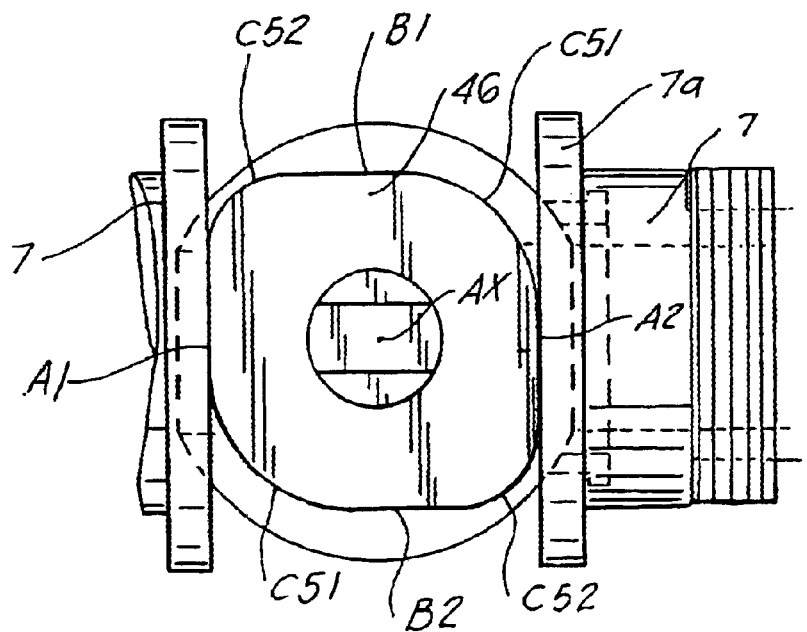
FIG. 3 illustrates a top view of the camming plate and ball valve member in the open position of FIG. 2.
Figure 4:
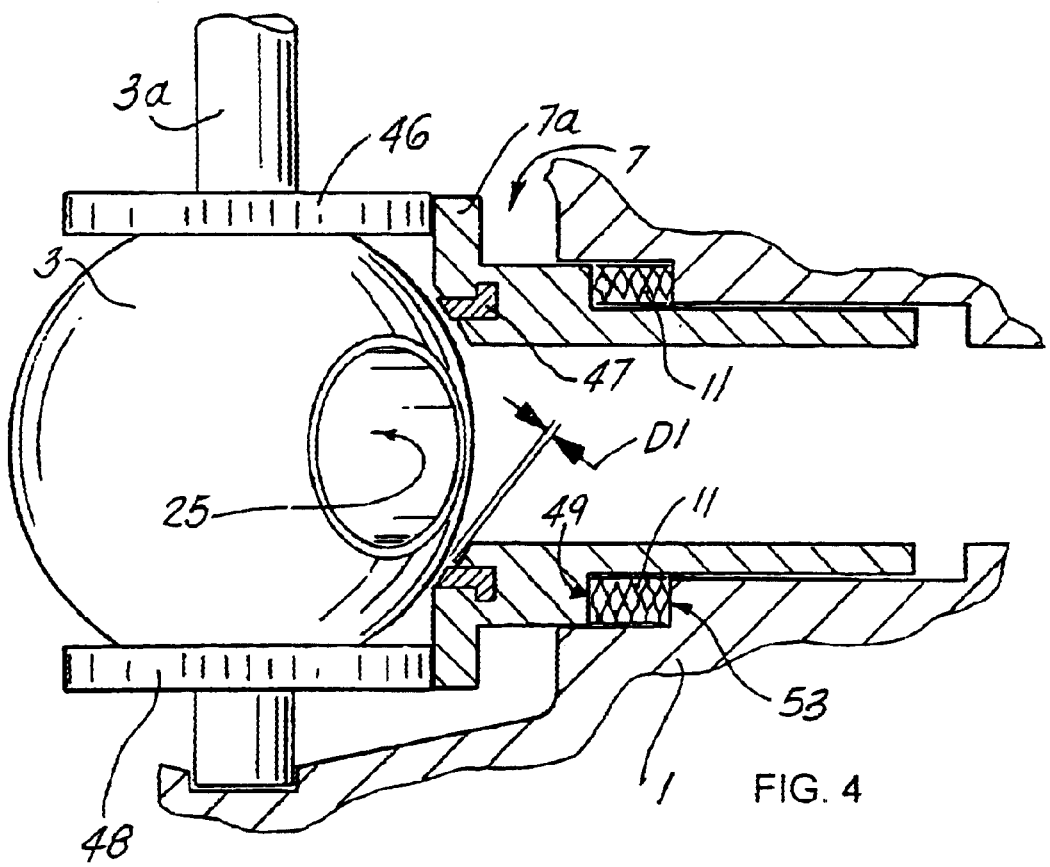
FIG. 4 illustrates a side cross-sectional view of the top-entry ball valve assembly in an intermediary position when being rotated closed.
Figure 5:
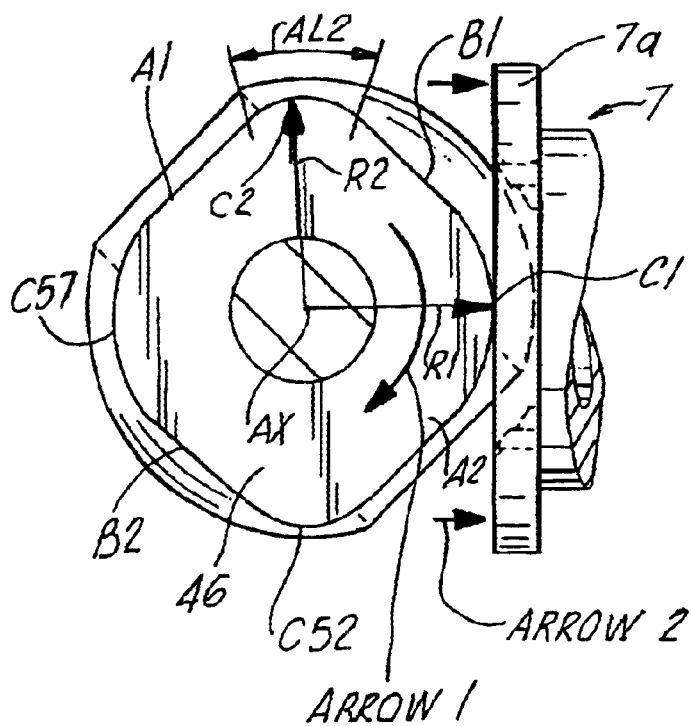
FIG. 5 illustrates a top view of the camming plate and ball valve member of the embodiment of FIG. 4.
Figure 6:
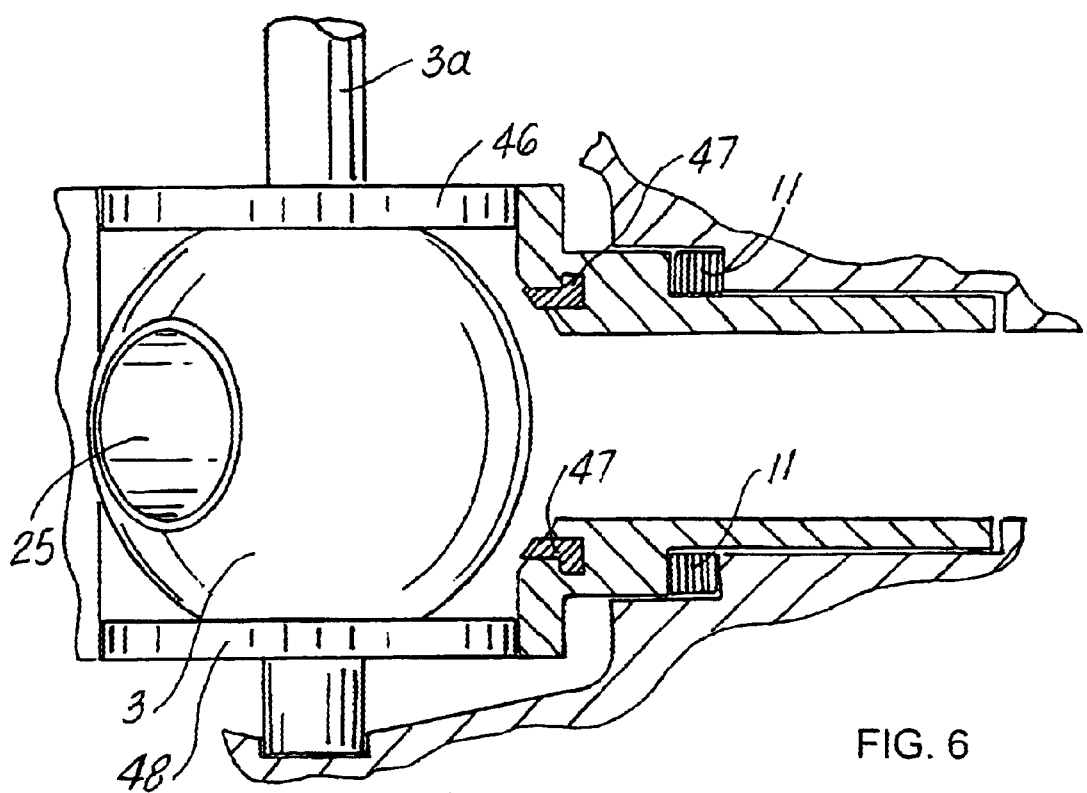
FIG. 6 illustrates a side cross-sectional view of the top-entry ball valve assembly when the seats are fully retracted.
Figure 7:
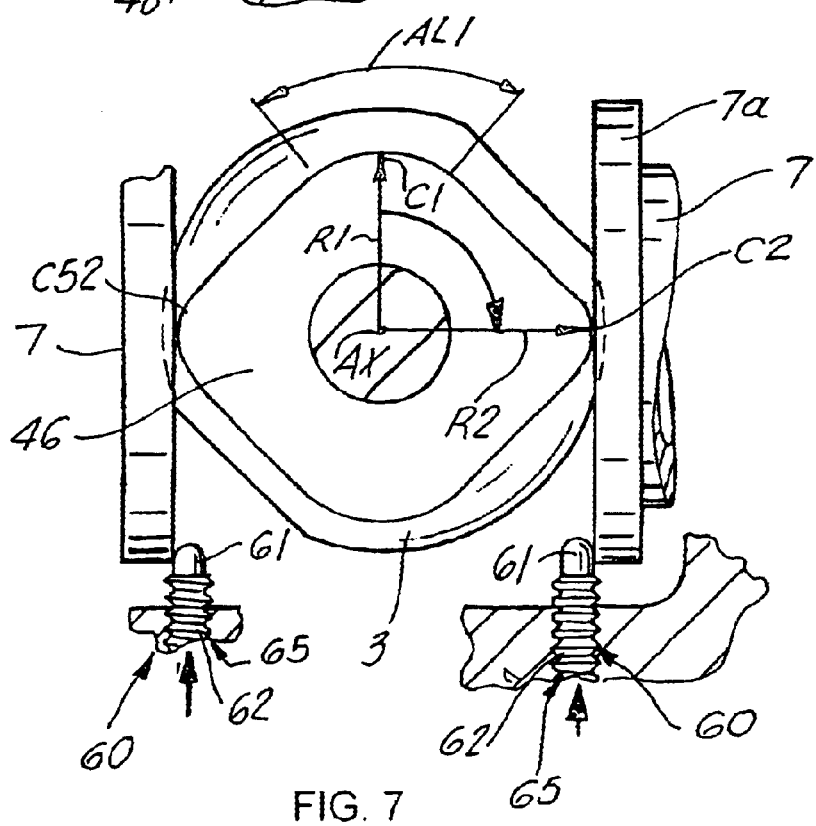
FIG. 7 illustrates a top view of the camming plate and ball valve member of the embodiment of FIG. 6, with the retraction maintaining or holding tool inserted.
Figure 8:
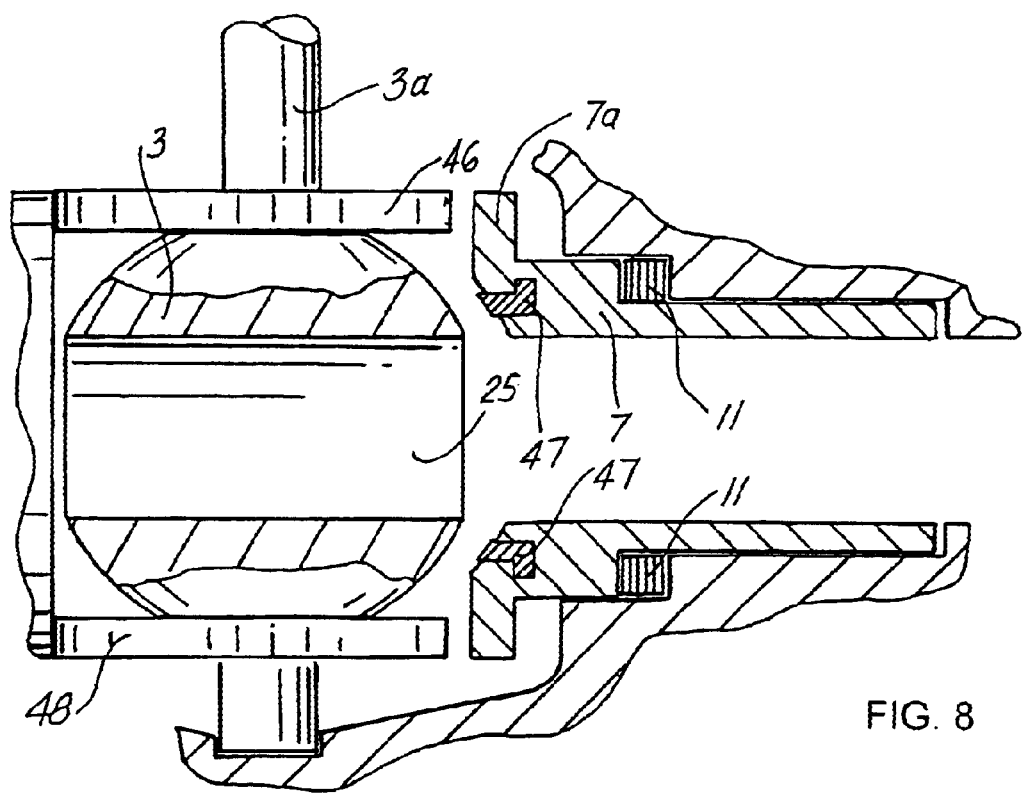
FIG. 8 illustrates a side cross-sectional view of the top-entry ball valve assembly when the ball valve is rotated for removal from the body or housing; and, FIG. 9 illustrates a top view of the camming plate and ball valve member of the embodiment of FIG. 8.

Referring now to the drawings and in particular FIGS. 1A, 1B, and 2–9, the top-entry ball valve assembly of the present invention is generally referenced by the numeral 100. The top-entry ball valve assembly 100 of the present invention is generally comprised of a body 1 allowing flow therethrough and which removably houses a ball valve member 3 and stem 3a. The ball valve member 3 via stem 3a fit within a pair of spring-biased seats 7 and is adapted to rotate to selectively block flow through the bore 25 in ball valve member 3. The upper and lower surfaces or shoulders of ball valve member 3 have integral thereto upper and lower cam plates 46 and 48, respectively (alternatively, the plates 46, 48 can be welded to member 3). Therefore, the upper and lower cam plates rotate in unison about the longitudinal axis of stem 3a. With reference to FIGS. 3, 5 and 7, since the upper and lower cam plates 46 and 48 are essentially identical, only one such cam plate will be described in detail. Upper cam plate 46 is a quasi-square shaped plate. The use of the term "quasi-square" will be made apparent by the description provided herein.

The quasi-square shaped plate includes two pairs of opposing parallel sides A1, A2 and B1, B2 which are essentially straight and are designed to abut in direct surface-to-surface contact with a forward annular flange 7a of the spring-biased valve seats 7 when the ball valve member 3 is in its open position (FIG. 2) or, alternately, closed position. However, the four corners of the quasi-square shaped plate are truncated and they do not have the same radius with respect to the center axis AX. The truncated corners provide paired opposing, camming corner-surfaces CS1 and CS2. While the corners are truncated, the truncation creates slightly curved camming corner-surfaces CS1 and CS2 having first and second arc-lengths AL1 and AL2 (FIGS. 5 and 7) so that as the ball valve member 3 is rotated about stem 3a, the camming operations are generally smooth and retraction of the spring-biased seats 7 is gradual.

With reference to the paired camming corner-surfaces CS1, radius R1 is the distance measured from the center C1 of the arc-length AL1, as best seen in FIG. 7, of each camming corner-surface CS1 of the pair to the center axis AX. Moreover, the paired camming corner-surface CS2 (the "repair cams") of the pair have a radius R2 measured from the center axis AX to the center C2 of the arc-length AL2 of such camming corner-surface CS2.

In the exemplary embodiment, radius R1 is less than radius R2. The pair of camming corner-surfaces CS1 serve to displace or apply a force to the forward annular flange 7a of the spring-biased seats 7 so that as the ball valve member 3 is rotated about the center axis AX of stem 3a, such as to close the ball valve member 3, the spring-biased seats 7 are pushed away or, displaced by distance D1, (FIG. 4) from the perimeter surface of the ball valve member 3 to prevent surface-to-surface contact therewith and, thus, wear in the seat 7 and ball valve member 3.

As can be readily seen, the arc-length AL1 of camming corner-surface CS1 is longer than the arc-length AL2 of the camming corner-surface CS2.

Referring now to FIG. 7, the increase in radius R2 of camming corner-surface CS2 increases the displacement of the forward end of the spring-biased valve seat 7 from the ball valve member 3. Thereby, retraction maintaining or holding tools 60 can be screwed into threaded retraction tool maintaining or tool holding ports 65 and in the front of forward annular flange 7a to maintain or hold the spring-biased seats 7 in a fully retracted position. Accordingly, the ball valve member 3 can be serviced. The pair of camming corner-surfaces CS2 applies a force to the forward angular flange 7a to maintain the retraction force to the valve seat 7 so that the ball valve member 3 can be rotated to the position shown in FIGS. 8 and 9 and then removed.

Figure 9:
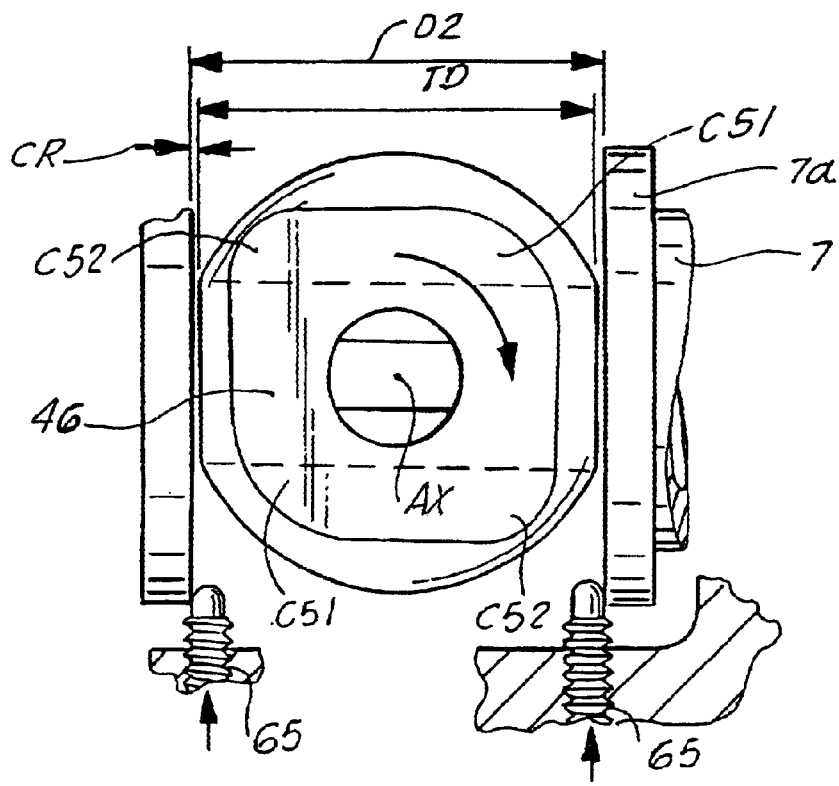

In the embodiments of FIG. 6 and 7, the displacement of the spring-biased seats 7 from the perimeter of the ball valve member 3 is greater than the displacement D1 of FIG. 4. As best seen in FIG. 9, the ball valve member 3 when rotated to the open position, the perimeter has a sufficient clearance CR with respect to forward flange 7a so that the ball valve member can be lifted and removed from the body or housing 1. Clearance CR is the difference between the truncated diameter TD of the ball valve member 3 and the distance D2 substantially equal to twice radius R2.

Since the tools 60 do not cause the retraction of the spring-biased seats 7 (but merely maintain or hold the seats 7 in the retracted position), preferably, the tools 60 have a substantially squared end. As described in the prior art, the prior tool tip is configured to effectuate sliding (retraction) of the seat 7. As can be appreciated, once the tools 60 are in place to hold the spring-biased seats 7 in a fully retracted position, the ball valve member 3 can be removed from the body or housing 1. Although, the camming corner-surfaces CS2 are removed, the seats 7 remain fully retracted since tools 60 are in place.

The spring-biased valve seats 7 are disposed in opposite sides of the ball valve member 3 in interior region 35 at the termini of respective ports 27 and 28. Each spring-biased valve seat 7 includes a forward angular flange 7a. Directly recessed along the interior circumferential surface of the flange 7a is a seat ring 47 of nylon, or similar material, which provides the actual annular seat contact with the ball valve member 3. Each spring-biased valve seat 7 also includes an annular rearward-facing shoulder 49 which is formed in the rearward periphery of the valve seat 7 and is positioned within the housing to face a similar annular forward-facing shoulder 53 formed in the interior region 35. An annular wave spring 11 is disposed in the space between shoulders 49 and 53.

Spring 11 is made up of multiple turns of spring metal (e.g., stainless steel) and applies a constant and uniform resilient bias force to shoulder 49 of the valve seat 7 to urge that seat 7 in a forward direction (OPPOSITE DIRECTION OF ARROW 2) so that seat ring 47 contacts ball valve member 3 in a sealing engagement. Therefore, seat ring 47 should be slightly compressible to assure good slidable and sealing contact.

The spring 11 allows the spring-biased valve seat 7 to automatically "snap back" or "spring back" into sealing engagement with the ball valve member 3 as the forces exerted by camming corner-surfaces CS1 or CS2 are removed upon rotation of the ball valve member 3.

The rearward portion of the valve seat 7 is adapted to contact the interior wall of body or housing 1 in order to permit selective slidable movement of the valve seat 7 in an axial direction. In this regard, a suitable O-ring 8 and back-up sealing ring 9 are disposed in a suitable annular channel 57 defined in the radially outward-facing surface of the valve seat 7 to effect sealing between the valve seat and the housing forward of spring 11. A second channel defined in the radially outward-facing surface, rearwardly of spring 11, receives another O-ring 10 to effect the desired sealing function.

Valve seat 7 are preferably made of suitable metal (e.g., carbon or stainless steel) and are provided with annular grooves at their forward end for receiving the nylon (or other material) seat ring 47.

Body or housing 1 has defined therein four threaded retraction maintaining or holding ports 65 extending substantially radially inward to communicate between the housing exterior and the interior region 35. Two (2) retraction maintaining or holding ports 65 are associated with each valve seat 7 and are located so as to open into interior region 35 at substantially diametrical opposed locations in close proximity to flange 7a when fully retracted, as best seen in FIG. 7.

In FIG. 1A, the two retraction maintaining ports 65 are shown. In FIGS. 7 and 9, the other two retraction maintaining ports 65 in the other side of the body or housing 1 are shown.

During normal valve operation, each retraction maintaining port 65 is engaged by a threaded retraction maintaining port screw 18 which, when tightened, urges a gasket or O-ring 19 into sealing engagement with body or housing 1 at the periphery of port 65. When it is desired to retract a valve seat 7 from its sealing engagement with ball valve member 3, screw 18 and O-ring 19 are removed from the appropriate port 65 and replaced by tool 60 (FIGS. 7 AND 9). Prior to removing the screw 18 and O-ring 19, the stem 3a is rotated such that camming corner-surfaces CS2 are at their center C2 engaging flange 7a to fully retract the spring-biased seats 7. Thereafter, tool 60 can be inserted.

The tool 60 includes a knurled knob, a threaded shaft 62 adapted to threadably engage the distal end 61. The retraction maintaining or holding port screw 18 is too short to contact the valve seat 7. Accordingly, the tool 60 is substantially longer so as to extend inward, when fully inserted into port 65, approximately to or just shy of seat ring 47.

The actual retracting procedure for seats 7 is preferably performed with two tools 60 simultaneously inserted into opposed retraction maintaining ports 65 to simultaneously retract each seat 7 at two spaced locations.

During normal operation, with the valve assembly 100 in the "opened" position of FIGS. 2 and 3, flow is permitted through bore 25 of the ball valve member 3. As ball valve member 3 and its stem 3a are turned in the direction of ARROW 1 (FIG. 5) from the "opened" position of FIGS. 2 and 3, through intermediary positions about camming surface CS1 to a "closed" position. As the ball valve member 3 and its stem 3a are turned, in unison, the camming plates 46 and 48 push against the spring-biased seats 7 at the forward angular flange 7a on opposing sides of ball valve member 3 to force seats 7 away from the perimeter of the ball valve member 3 to prevent wearing of seat ring 47 and ball valve member 3 during rotation. Moreover, the spring-biased seats 7 "snap back" or "spring back" into place when the camming plates 46 and 48 complete there arc-of-rotation about the arc length AL1 because of the constant force of wave springs 11 against the spring-biased seats 7.

Referring now to FIGS. 6–9, when the valve assembly 100 is serviced, the spring-biased valve seats 7 are fully retracted to remove the ball valve member 3. The present invention provides opposing camming corner-surfaces CS2 to engage the flange 7a of seat 7 and to fully retract them. Thereafter, the tools 60 can be inserted into the path of flange 7a to retain seat 7 in the fully retracted position. Accordingly, the stem 3a can be rotated to remove camming corner-surfaces CS2 from the position shown in FIGS. 6 and 7, once the tools 60 are in place to the position shown in FIGS. 8 and 9. Accordingly, the spring-biased seats 7 "snap back" or "spring back" into place when the camming plates 46 and 48 complete there arc-of-rotation about the arc length AL2 because of the constant force of wave springs 11 against the spring-biased seats 7.

Referring again to FIG. 1, the top-entry ball valve assembly 100 includes a body or housing 1 having a coaxial flow ports 27 and 28 defined at its opposite ends. Ports 27 and 28 may be employed interchangeably as inlet and outlet ports and their common axis defines the axially or flow direction.

The body or housing 1 includes annular flanges 1a and 1b which surround ports 27 and 28, respectively, and are provided with annularly spaced apertures or holes to permit attachments of the body or housing 1 to corresponding flanges in a pipeline. Body or housing 1 includes an enlarged interior region 35 at which both ports 27 and 28 terminate and in which flow control operation of the valve assembly 100 is effected.

A generally cylindrical access opening communicates with interior region 35 in a direction perpendicular to the flow. The end of access opening remote from interior region 35 is surrounded by an annular flange 37. Flange 37 has a plurality of threaded apertures or holes adapted to engage respective screws 12 to sealingly engage a removable bonnet 2 over the access opening.

A gasket 14 is interposed between bonnet 2 and flange 37 to effect sealing. In the exemplary embodiment, the access opening is at the top of the valve body or housing 1.

The interior region 35 is substantially symmetrical and is adapted to receive substantially identical spring-biased valve seat 7 at each of ports 27 and 28. In addition, a symmetrical ball valve member 3 and its stem 3a are adapted to be received in interior region 35 through the access opening. Specifically, the stem 3a of the ball valve member 3 includes a generally lower stem portion adapted to be journalled in a trunnion bearing 4 disposed in a recess (NOT SHOWN) defined at the lower end of the interior region 35. Annular sealing elements 5, 6 are disposed about stem 3a at appropriate locations. The upper portion of stem 3a is journalled in a trunnion bearing 4 disposed in a central aperture 2a of bonnet 2 through which stem 3a extends. Annular sealing elements 6,5 are disposed about stem 3a at appropriate locations in aperture 2a.

The bore 25 is defined through the spherical body portion of the ball valve member 3 and, depending upon the rotational position of the ball valve member 3 in the interior region 35, may be coaxially aligned with ports 27 and 28 to permit substantially unrestricted flow through the valve assembly 100. As is conventional, the ball valve member 3 may be rotated about its axis to misalign bore 25 relative to ports 27 and 28 and thereby restrict or shut off flow, as desired.

The upper end of stem 3a projecting beyond bonnet 2 is appropriately contoured (e.g., proved with two flattened sides) so as to be readily engaged by a suitable wrench or tool for selectively turning the ball valve member 3. A stem bearing 15 surrounds stem 3a at the top surface of bonnet 2, as does a stop plate 16 which covers tapped holes formed in a raised central portion of the bonnet 2. These tapped holes receive a stop screw 13 employed during assembly. A retainer ring 17 is disposed about stem 3a to secure stop plate 16 in place.

The underside of bonnet 2 has a hole defined therein for retaining a grounding plunger 23 which is urged downwardly into contact with ball valve member 3 by a grounding spring 24. In addition, a plurality of threaded sealant injection apertures 40 are defined through the body or housing 1 and in bonnet 2 to receive respective threaded sealant injection fittings 20. A threaded drain opening 42 is also defined in the valve body or housing 1. A bonnet alignment pin 22 is coupled to annular flange 37 to align with bonnet 2.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A ball valve assembly comprising the method steps of:
    ball valve member;
    valve seats;
    means for retaining said valve seats in sealing engagement with the ball valve member when the ball valve member is in a open position;
    means for rotating said ball valve member to a closed position;
    means for applying an opposing camming corner-surfaces to said valve seats to retract and displace said valve seats to minimize surface-to-surface contact and wearing; and,
    means for limiting rotation of said ball valve member;
    wherein said means for applying said opposing camming corner-surfaces to said valve seats includes means for applying second opposing camming corner-surfaces to the valve seats to fully retract and displace the valve seats.

2. The assembly of claim 1, further comprising:
    means for holding said valve seats fully retracted even after the application of said second opposing camming corner-surfaces is removed.

3. The assembly of claim 2, wherein said applying means comprises a quasi-square shaped plate with truncated corners wherein said opposing camming corner-surfaces has a first arc-length and a first radius measured from a longitudinal axis of said ball valve member to a center of said first arc-length; and the second opposing camming corner-surfaces has a second arc-length and second radius measured from said longitudinal axis of said stem to a center of said second arc-length.

4. The assembly of claim 3, wherein the truncation creates a slightly curved corner so that as said ball valve member is rotated the camming operations are smooth.

5. The assembly of claim 3, wherein said plate further includes: two pairs of opposing parallel sides which are essentially straight and a first pair of opposing parallel sides is designed to abut in direct surface-to-surface contact with a forward annular flange of said seats when the ball valve member is in its open and closed position.

6. A method of minimizing wearing in a ball valve assembly comprising the method steps of:
    retaining valve seats in sealing engagement with a ball valve member when the ball valve member is open;
    simultaneously, while rotating said ball valve member to a closed position, applying an opposing camming corner-surfaces to the valve seats to retract and displace the valve seats to thereby minimize surface-to-surface contact and wearing;
    removing a stop plate and stop screw;
    simultaneously, while rotating said ball valve member, applying second opposing camming corner-surfaces to the valve seats to fully retract and displace the valve seats;
    removing a retraction maintaining screw and seal from a port; and,
    inserting a retraction maintaining tool in said port.

7. The method of claim 6, further comprising the step of:
    rotating said ball valve member to remove the second opposing camming corner-surfaces from the valve seats;
    holding the valve seats fully retracted with said retraction maintaining tool; and,
    removing the ball valve member.

8. A ball valve assembly comprising:
    a ball valve member having a stem;
    a pair of spring-biased valve seats adapted to be retracted; and,
    a pair of camming plates fixedly coupled to the top and bottom of the ball valve member about the stem and which rotate in unison with said stem, each camming plate includes a pair of opposing camming corner-surfaces for retracting the spring-biased valve seats a predetermined distance as the ball valve member is rotated between open and closed positions, wherein said each camming plate further comprises:
        a second pair of opposing camming corner-surfaces for retracting the spring-biased valve seats a second predetermined distance wherein the second predetermined distance is greater than said predetermined distance.

9. The assembly of claim 8, further comprising:
    a top-entry ball valve housing:
        a bonnet removably coupled to the housing;
        a stop plate coupled to said stem exterior to said housing;
        a stop screw coupled to said bonnet to limit the rotation of said stop plate as said stem is rotated between said open position and said closed position.

10. The assembly of claim 9, wherein removal of said stop plate and said stop screw allows said stem to be rotated so that said second pair of opposing camming corner-surfaces for retract said spring-biased valve seats said second predetermined distance.

11. The assembly of claim 8, wherein said each camming plate is a quasi-square shaped plate with truncated corners wherein the first pair of opposing camming corner-surfaces has a first arc-length and a first radius measured from a longitudinal axis of said stem to a center of said first arc-length; and said second pair of opposing camming corner-surfaces has a second arc-length and second radius measured from said longitudinal axis of said stem to a center of said second arc-length.

12. The assembly of claim 11, wherein the truncation creates a slightly curved corner so that as said ball valve member is rotated about said stem, the camming operations are smooth.

13. The assembly of claim 8, wherein said each camming plate further includes: two pairs of opposing parallel sides which are essentially straight and a first pair of opposing parallel sides is designed to abut in direct surface-to-surface contact with a forward annular flange of said spring-biased seats when the ball valve member is in its open position.

14. The assembly of claim 13, wherein a second pair opposing parallel sides is designed to abut in direct surface-to-surface contact with a forward annular flange of said spring-biased seats when the ball valve member is in its closed position.

15. The assembly of claim 8, wherein said ball valve member is sealed in said spring-biased seat when in said open position.

* * * * *